May 17, 1932.   E. E. JOHNSON   1,858,592
WELL SCREEN
Filed April 1, 1929
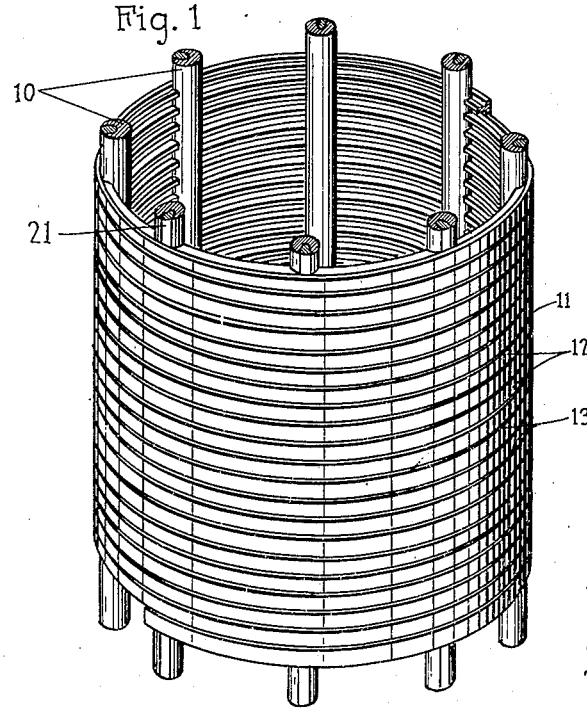
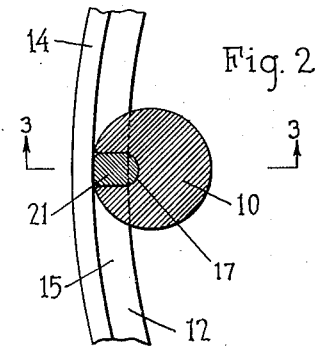
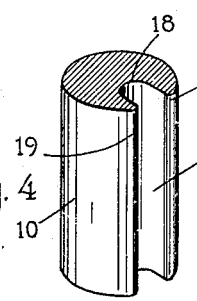
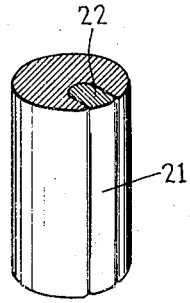
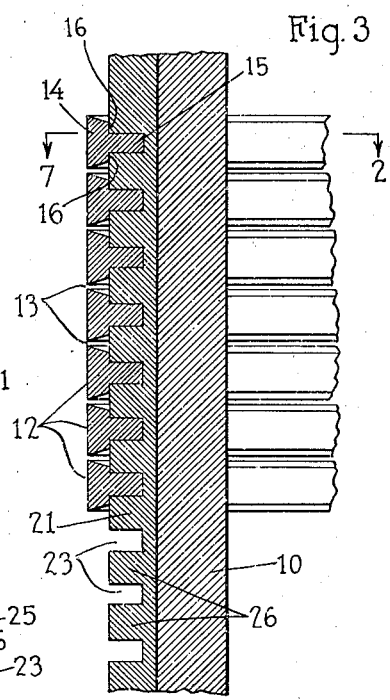
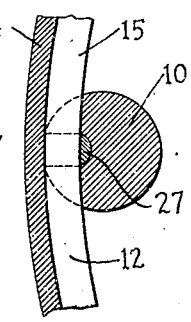
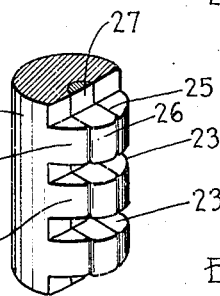
Inventor
Edward E. Johnson
By Caswell & Sagaard
Attorneys Patented May 17, 1932

1,858,592

UNITED STATES PATENT OFFICE

EDWARD E. JOHNSON, OF ST. PAUL, MINNESOTA, ASSIGNOR TO EDWARD E. JOHNSON, INCORPORATED, OF ST. PAUL, MINNESOTA, A CORPORATION

WELL SCREEN

Application filed April 1, 1929. Serial No. 351,690.

My invention relates to well screens, and particularly to well screen wall construction formed with adjoining elements having crevices therebetween through which the water may freely pass into the screen proper and from which the sand surrounding the screen is excluded.

In such construction, three primary objects are sought, large capacity of intake for the free entrance of water at a low rate of flow, great strength of screen wall to resist the lateral or radial pressure in the case of tubular screen due to the solids in the strata of the earth in which the screen is placed, and great longitudinal strength to permit of frequently handling the screen in removing and replacing the same from and to considerable depths without danger of injury to the screen or of varying the spacing of the screen wall elements.

An object of the invention resides in providing a well screen in which the spaced elements are supported solely on a number of supporting rods.

Another object of the invention resides in providing a well screen in which the spaced elements are secured to the supporting rods by soldering.

A still further object of the invention resides in forming the elements with webs and in constructing the rods with grooves adapted to receive the webs of said elements, said webs and rods being soldered to one another along their surfaces of contact.

Another object of the invention resides in forming the portions of the supporting rods between the grooves therein with pockets, and in inserting into the said pockets slugs of solder adapted to be fused to said rods and elements to secure the same together.

An object of the invention resides in forming the supporting rod with a longitudinal groove, in inserting a strip of solder within said groove, and in cutting the supporting rod with transverse grooves extending through said strip of solder, to form solder slugs disposed between said grooves.

A still further object of the invention resides in cutting said transverse grooves of a depth less than said longitudinal grooves to leave portions of the solder wire uncut for holding the solder slugs attached to one another.

Other objects of the invention reside in the details of construction thereof, and in the novel combination and arrangement of parts hereinafter illustrated or described.

In the drawings:

Fig. 1 is a perspective view of a section of a well screen illustrating an embodiment of my invention.

Fig. 2 is a fragmentary elevational view of one of the supporting rods and a portion of the well screen element attached thereto and drawn to an enlarged scale.

Fig. 3 is an elevational sectional view taken on line 3—3 of Fig. 2.

Fig. 4 is a perspective view of one of the supporting rods showing the same grooved to receive the strip of solder.

Fig. 5 is a view similar to Fig. 4 showing the rod with the strip of solder inserted into the groove thereof.

Fig. 6 is a perspective view of the structure shown in Fig. 5 with the transverse grooves cut across the same.

Fig. 7 is a plan sectional view similar to Fig. 2, taken on line 7—7 of Fig. 3.

In the construction of my improved well screen, a number of longitudinally disposed supporting rods 10 are employed which are arranged in circular formation. Upon these rods is wound a formed ribbon 11, the convolutions 12 of which, as indicated in Figs. 1 and 3, are uniformly spaced from one another to form a series of crevices 13 through which the water may pass from the exterior of the screen and into the interior thereof. These crevices serve to strain the water as the same passes through the screen, so as to exclude the sand and other undesirable substances from the water. In the construction of the screen, different widths of crevices may be provided to meet with the various soil conditions, and the requirements of the particular installation with which the screen is to be employed. With my invention, the ribbon 11 is previously formed in the desired shape by drawing or rolling or otherwise. This ribbon, as best shown in Fig. 3, is preferably formed of T-shaped construction and is provided with a flange 14 and a web 15 issuing outwardly therefrom. The attachment of the web 15 to the intermediate portion of the flange 14 provides two shoulders 16 which engage the surfaces of the rods 10 in a manner to be presently described. If desired, an L-shaped or a trapezoidal form of ribbon may be employed having a suitable web or other structure by means of which the same may be attached to the supporting rods. The rods 10 may be round, square or hexagonal or may be shaped in any other form, if desired, the same serving merely to support the ribbon and to lend rigidity to the screen.

The rods 10 are constructed as follows. Each of the rods 10 is formed with a longitudinal groove 17, as shown in Figs. 2 and 4. This groove is preferably curved at the inner end 18 thereof, and the corners 19 and 20 of said groove are preferably rounded to remove the sharpness therefrom. The groove 17 is of a depth slightly greater than its width and extends partially through the rod a distance slightly less than half the diameter of the rod. Within the groove 17 is disposed a strip of wire solder 21 which substantially fills the entire groove. The groove 17 is preferably constructed of a width slightly less than the diameter of the wire solder to be used, and the said wire solder is bodily forced into the groove. In the forcing of the solder into the said groove, the solder may be first rolled to give the same a form substantially corresponding to the groove, or the solder may be merely forced into the groove, the same being caused to conform to the shape thereof during its entrance into the said groove. The depth of the groove 17 is such that when the solder has been properly inserted into the same, the edge of the solder, which I have indicated at 22, lies flush with the edges 19 and 20 of the rod 10 adjacent the said groove 17. The wire solder 21 is preferably provided with its own flux either as a cone within it or a coating on its surface, so that when imbedded in groove 17, no further application of flux is necessary to produce a well soldered joint on the application of heat, as will presently be described.

After the groove 17 has been properly filled with solder, a number of transverse grooves 23 are cut in the rod 10 which extend completely across the groove 17 and strip 21 of solder. This forms ledges or portions 24 in the rod 10 between the grooves 23, while the groove 17 passing through said ledges forms pockets 25 therein. As will be noted, the grooves 23 are preferably of a depth less than the depth of the groove 17, which form the strip of solder into a number of solder slugs 26, disposed within the various pockets 25 and connected together by means of a stem 27. The stem 27 serves to hold all of the slugs 26 in proper position within the various pockets so as to retain the grooves 23 of equal width throughout their extent.

In the construction of the screen, the various rods 10 are arranged in circular formation and are preferably equally spaced, and are mounted upon some suitable support (not shown) where they may be held in proper position. The screen ribbon is then wound helically around the said rods and during such winding, the flanges 15 thereof forced into the successive grooves 23. In the formation of the grooves 23, the same are cut helically and are so spaced that sufficient lead is had to cause the convolutions of the ribbon to become spaced from one another the required amount to form the crevices 13. The entire screen is thus wound and the ends of the ribbon temporarily anchored. Heat is next applied to the various rods 10 in any suitable manner as to cause the solder slugs 26 to melt and to flow between the joints of the ribbon 11 and the rods 10, and to solder the same together. If desired, the process may be carried on by means of a device such as shown in my Patent No. 1,175,871 for Machines for securing rods in pipes. This operation is repeated for each one of the rods until all of the rods have been soldered to the convolutions to the well screen ribbon, leaving the parts of the screen rigidly and permanently secured together to form the desired well screen. If desired, the web 15 of the ribbon 11 may be formed undercut, as disclosed in my copending application for patent, Ser. No. 351,691 to cause the solder flowing into the same to form a key for holding the convolutions of the ribbon 11 in place, as well as through the soldered joint. It is to be further understood that the entire ribbon 11 may be constructed wedge shaped with the reduced portion thereof serving as a flange, and insertible within the various grooves within the supporting rod. It can further be comprehended that the grooving of the rods for the reception of the webs of the well screen ribbon may be made during the winding of the ribbon upon the rods, or the same may be done prior to the mounting of the rods upon the supporting structure therefor. It is further to be noted that, if desired, the rods may be successively soldered as the convolutions are attached to the same, or each rod separately soldered after the completed screen has been formed.

The invention is highly meritorious in that a well screen, having an extremely rigid and substantial well screen wall is produced. An unobstructive path for the flow of the water from the exterior to the interior of the screen is provided to prevent clogging of the screen by particles of sand and foreign substances passing through the crevices between the convolutions of the screen ribbon. The screen can be constructed with great rapidity and the structure has ample stability, due to the method of inserting the winding comprising the screen wall into the grooved or notched supporting members, to allow of its being handled safely in the necessary processes of manufacture, even before the soldering operation is begun. By the use of soldered joints, all play between the rods and ribbon is eliminated, entirely precluding the shifting of the convolutions with respect to one another, and the changing of the spacing of the same and the form of the screen. The screen is entirely self-supporting, and when attached to suitable terminals requires no additional reinforcing structure.

Changes in the specific form of my invention, as herein disclosed, may be made within the scope of what is claimed without departing from the spirit of my invention.

Having described my invention, what I claim as new and desire to protect by Letters Patent is:

1. A well screen comprising a supporting member formed with a number of grooves, a plurality of well screen elements having webs, said webs being disposed within said grooves, and solder keys formed on said member and disposed between the webs of said screen elements.

2. A well screen comprising a supporting member formed with a number of grooves, a plurality of well screen elements having webs, said webs being disposed within said grooves, said pockets formed in the portions of said supporting member between the grooves thereof, and solder keys disposed within said pockets.

3. A supporting member for well screen ribbon having a longitudinal groove, a strip of solder disposed within said groove, said member and strip of solder being formed with a plurality of spaced transverse grooves extending across said longitudinal groove.

4. A supporting member for well screen ribbon having a longitudinal groove, a strip of solder disposed within said groove, said member and strip of solder being formed with a plurality of spaced transverse grooves extending across said longitudinal groove, said transverse grooves being of a depth less than the depth of said longitudinal groove.

5. A supporting member for well screen ribbon having a series of spaced transverse grooves, pockets formed in the portions of said supporting member between the grooves, and solder disposed within said pockets.

6. A supporting member for well screen ribbon having a series of spaced transverse grooves, pockets formed in the portions of said supporting member between the grooves, said pockets extending completely across the portions of said member between said grooves, slugs of solder within each of said pockets, and means for holding said slugs of solder from longitudinal movement along said pockets.

7. A supporting member for well screen ribbon having a series of spaced transverse grooves, pockets formed in the portions of said supporting member between the grooves, said pockets extending completely across the portions of said member between said grooves, slugs of solder within each of said pockets, and a strip of solder integrally connected with said slugs of solder for holding said slugs of solder from longitudinal movement within said pockets.

8. A supporting member for well screen ribbon having a series of transverse grooves, pockets formed in the portions of said supporting member standing between the grooves, and solder and flux disposed within said pockets.

9. A rod having a plurality of transverse grooves adapted to receive screen wall elements and having pockets adjacent said transverse grooves for the reception of solder.

10. A well screen comprising a supporting member having pairs of spaced ledges, each pair being separated from the adjoining pair, a plurality of well screen elements having portions thereof disposed between pairs of ledges and contacting with the ends thereof, and solder lugs disposed between the ledges of each pair and coextensive in length therewith.

In testimony whereof I have affixed my signature to this specification.

EDWARD E. JOHNSON.